United States Patent [19]

Sugihara et al.

[11] Patent Number: 5,614,165
[45] Date of Patent: Mar. 25, 1997

[54] PROCESS FOR PURIFICATION OF HYDROGEN PEROXIDE

[75] Inventors: Yasuo Sugihara; Kazushige Tanaka; Hisashi Sakaitani, all of Tokyo, Japan

[73] Assignee: Mitsubishi Gas Chemical Co., Inc., Tokyo, Japan

[21] Appl. No.: 408,123

[22] Filed: Mar. 21, 1995

Related U.S. Application Data

[63] Continuation-in-part of Ser. No. 249,978, May 27, 1994, abandoned.

[30] Foreign Application Priority Data

May 28, 1993 [JP] Japan .................................. 5-127310

[51] Int. Cl.$^6$ ................................................ C01B 15/01
[52] U.S. Cl. ................................................ 423/584
[58] Field of Search ...................................... 423/584

[56] References Cited

U.S. PATENT DOCUMENTS

| | | | |
|---|---|---|---|
| 4,792,403 | 12/1988 | Togo et al. | 210/692 |
| 4,999,179 | 3/1991 | Sugihara et al. | 423/584 |
| 5,055,286 | 10/1991 | Watanabe et al. | 423/584 |
| 5,200,166 | 4/1993 | Shiga et al. | 423/584 |

FOREIGN PATENT DOCUMENTS

| | | |
|---|---|---|
| 0502466 | 9/1992 | European Pat. Off. . |
| 2624500 | 6/1989 | France . |
| 5-17105 | 1/1993 | Japan . |

*Primary Examiner*—Wayne Langel
*Attorney, Agent, or Firm*—Wenderoth, Lind & Ponack

[57] ABSTRACT

A process for purification of hydrogen peroxide is provided which comprises contacting an aqueous hydrogen peroxide solution with a chelate resin. According to the process, it is possible to remove impurities in the aqueous hydrogen peroxide solution in high efficiency, and particularly, it is possible to remove iron, aluminum, etc., which are difficult to remove singly by ion exchange resins, up to extremely low concentrations. Highly pure hydrogen peroxide solutions obtained by this invention can suitably used for washing of silicon wafers.

6 Claims, No Drawings

PROCESS FOR PURIFICATION OF HYDROGEN PEROXIDE

This application is a continuation-in-part of now abandoned application, Ser. No. 08/249,978, filed May 27, 1994.

DETAILED DESCRIPTION OF THE INVENTION

1. Industrially Applicable Field

This invention relates to a process for purification of hydrogen peroxide which comprises removing impurities existing in a very small quantity in an aqueous hydrogen peroxide solution, and particularly to a process for preparation of highly pure hydrogen peroxide usable for washing silicon wafers, etc.

2. Prior Art

Basic or acidic aqueous hydrogen peroxide solutions are widely used for washing silicon wafers. It is necessary to use extremely highly pure aqueous hydrogen peroxide solutions for this use, and it is usually required that the concentration of impurities in the aqueous hydrogen peroxide solution is 1 ppb or less. When the densities of integrated circuits are high, the concentration is sometimes required to be 0.2 ppb or less, and sometimes to be 0.1 ppb or less.

As a process for purification of hydrogen peroxide, treatment with ion exchange resins is known, but for some impurities it is difficult to remove them completely singly by ion exchange resins. For example, it is extremely difficult to remove iron, aluminum, etc. up to 0.2 ppb or less. When these impurities are contained in washing chemicals, they adhere to silicon wafers and have a large influence on electric characteristics of semiconductors prepared from the silicon wafers, and therefore a purification technique superior to the prior techniques is desired.

The present inventors previously found a method of removing organic impurities from an aqueous solution of hydrogen peroxide, which comprises bringing an aqueous solution of hydrogen peroxide containing organic impurities into contact with a halogen-containing porous resin having a true specific gravity in the wet state of 1.1 to 1.3 (U.S. Pat. No. 4,792,403).

Shiga et al. found that a highly pure aqueous hydrogen peroxide solution can be prepared safely and inexpensively without lowering the ratio of removal of the strong acid anions and with lowering decomposition of hydrogen peroxide by an anion exchange resin, by removing, the anionic impurities using a bicarbonate salt type or carbonate salt type anion exchange resin and with continuous or semi-continuous addition of 0.1 to 5 milliequivalent/liter-aqueous hydrogen peroxide solution of an acid or its salt having an acid dissociation index pKa of 5 or less in water (Japanese Patent Application Kokai (Laid-Open) No. 17105/1993).

However, even by these processes, it was difficult to remove iron and aluminum in an aqueous hydrogen peroxide solution up to 0.2 ppb or less.

PROBLEMS TO BE SOLVED BY THE INVENTION

The object of this invention is to remove impurities from an aqueous hydrogen peroxide solution in high efficiency, and particularly to provide a practical purification technique which makes it possible to remove impurities such as iron and aluminum, which are removed only in low efficiency singly by ion exchange resins, in high efficiency up to a concentration of 0.2 ppb or less.

MEANS FOR SOLVING THE PROBLEMS

The present inventors intensely studied for attaining the above object, and as a result they found that impurities such as iron and aluminum, which can be removed only in low efficiency by ion exchange resins, can be removed in good efficiency by contacting an aqueous hydrogen peroxide solution with a chelate resin, and completed this invention.

Namely, this invention relates to a process for purification of hydrogen peroxide which comprises contacting an aqueous hydrogen peroxide solution with a chelate resin.

Any chelate resin can be used as the chelate resin used in this invention so long as it is a resin having a chelating ability to metal ions, and includes an iminodiacetic type, polyamine type, phosphonic acid type and N-methylglucamine type chelate resin or the like, but particularly preferable is a phosphonic acid type chelate resin.

The phosphonic acid type chelate resin is a chelate resin in which a functional group having phosphonic acid group(s) was introduced, and particularly preferable is an iminomethylenephosphonic acid type chelate resin or iminodi(methylenephosphonic) acid type chelate resin having a group represented by the following formula in which a phosphonic acid group is bonded to a nitrogen atom via a methylene group. The phosphonic acid group is usually used in the form of a free acid, but can also be used in the form of a salt such as an ammonium salt. Phosphonic acid type chelate resins are particularly preferable in practical use since they do not considerably deteriorate when used for purification hydrogen peroxide for a long time.

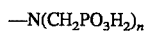

$$-N(CH_2PO_3H_2)_n$$

wherein n denotes 1 or 2.

There in no particular limitation about the operation temperature in the purification process with a chelate resin of this invention, but preferred operation temperature is $-25°$ to $25°$ C., more preferably $-15°$ to $15°$ C. It is possible to inhibit deterioration of the resin and maintain the activity of the resin for a longer time by making operation at a low temperature.

The purification process of this invention can be conducted by any of a batch method and a flow method, but the flow method is preferable from the aspect of purification efficiency. In the case of purification by the flow method, the liquid passing flow can be an ascending or a descending.

The concentration of hydrogen peroxide is not particularly limited, but an aqueous hydrogen peroxide solution of a concentration of 1 to 75, preferably 1 to 40 weight % is usually used.

It is possible to use, as the raw material aqueous hydrogen peroxide solution used in this invention, an aqueous hydrogen peroxide solution containing a nonphosphorus acidic compound such as sulfuric acid, hydrochloric acid or nitric acid or a salt thereof, or an aqueous hydrogen peroxide solution containing a stabilizer of hydrogen peroxide such as ethylenediaminetetraacetic acid or a salt thereof, besides an aqueous hydrogen peroxide solution not containing an additive.

It is particularly preferable to use as the raw material aqueous hydrogen peroxide solution an aqueous hydrogen peroxide solution having a content of total phosphate anions of under 0.1 ppm. Impurities such iron and aluminum are particularly efficiently removed by contacting hydrogen peroxide having a content of total phosphate anions of under 0.1 ppm with a chelate resin. The total phosphate anions include a phosphate anion and condensed phosphate anions represented by a pyrophosphate anion, and the content of the total phosphate anions means a total quantity thereof. The content of total phosphate anions is measured by the colorimetric method.

When an aqueous hydrogen peroxide solution having a content of total phosphate anions higher than 0.1 ppm, it is preferable to make the content of total phosphate anions under 0.1 ppm by a pretreatment and then contact the solution with the chelate resin. The pretreatment includes a method which comprises contacting it with an ion exchange resin, a method utilizing distillation, or the like, but preferable is a method which comprises contacting it with an anion exchange resin or a mixture of an anion exchange resin and a cation exchange resin. A strong-basic type of anion exchange resin containing bicarbonate ions is preferably used as an anion exchange resin. When a mixture of an anion exchange resin and a cation exchange resin is used, the proportion is 10:90~90:10, preferably, 30:70~70:30. In said mixture, the above-mentioned one is employed as an anion exchange resin, while, as a cation exchange resin, a strong-acid type of cation exchange resin containing a sulfonic acid group is used.

There is no particular limitation about the operation temperature in the purification process with an anion exchange resin or a mixture of an anion exchange resin and a cation exchange resin of this invention, but the preferred operation temperature is $-25°$ to $25°$ C., more preferably $-15°$ to $15°$ C. It is possible to inhibit the deterioration of the resin and maintain the activity of the resin for a longer time by operating at a low temperature. An aqueous hydrogen peroxide solution having a content of total phosphate anions of under 0.1 ppm can be purified by directly contacting it with the chelate resin.

EXAMPLES

This invention is described below by examples. The content of total phosphate anions and metal were determined by the colorimetric method and the ICP-MS method (Inductively Coupled Plasma-Mass Spectrometry), respectively.

EXAMPLE 1

10 liters of 31 wt % raw aqueous hydrogen peroxide solution containing 20 ppb of aluminum, 3 ppb of iron and 10 ppm of total phosphate anions as impurities was passed through a Teflon-made column of inside diameter 15 mm and length of 30 cm packed with 20 ml of an anion exchange resin Amberlite IRA-400 (bicarbonate salt type, made by Organo Corporation), at a flow rate of a space velocity of 10/hr$^{-1}$. The concentration of total phosphate anions in the aqueous hydrogen peroxide solution after the passing was 0.05 ppm. The resultant aqueous hydrogen peroxide solution was then passed through a Teflon-made column of inside diameter 15 mm and length 30 cm packed with 20 ml of Diaion CRA-100 (H type, made by Mitsubishi Kasei Corporation), an iminomethylenephosphonic acid type chelate resin, at a space velocity of 10/hr$^{-1}$. The column temperatures in both columns were maintained at 5° C. The iron content after the purification was under 0.1 ppb, lower limit of the determination. The aluminum content after the purification was under 0.1 ppb, lower limit for the determination.

Comparative example 1

10 liters of 31 wt % raw aqueous hydrogen peroxide solution containing 20 ppb of aluminum and 10 ppm of total phosphate anions as impurities was purified under the same conditions as in Example 1. After the purification, the iron content was 1 ppb, and the aluminum content was 6 ppb. after the purification was 6 ppb.

Comparative example 2

One liter of 31 wt % raw aqueous hydrogen peroxide solution containing 2 ppb of iron, 30 ppb of aluminum and 0.02 ppm of total phosphate anions as impurities was passed through a Teflon-made column of inside diameter of 15 mm and length of 30 cm packed with 20 ml of a cation exchange resin Amberlite IR-120B (H type, made by Organo Corporation), at a space velocity of 10/hr$^{-1}$. The effluent was then passed through a Teflon-made column of inside diameter of 15 mm and length of 30 cm packed with 20 ml of an anionic exchange resin Amberlite IRA-400 (bicarbonate salt type, made by Organo Corporation), at a space velocity of 10/hr$^{-1}$. The column temperatures in both columns were maintained at 5° C. After the purification, the iron content was 0.5 ppb and the aluminum content was 3 ppb.

Comparative Example 3

10 liters of 31 wt % raw aqueous hydrogen peroxide solution containing 20 ppb of aluminum, 3 ppb of iron and 10 ppm of total phosphate anions as impurities was passed through a Teflon-made column of inside diameter 15 mm and length 30 cm packed with 10 ml of an anion exchange resin Amberlite IRA-400, at a flow rate of a space velocity of 10 hr$^{-1}$. The concentration of total phosphate anions in the aqueous hydrogen peroxide solution after the passing was 0.5 ppm. The resultant aqueous hydrogen peroxide solution was then passed through a Teflon-made column of inside diameter 15 mm and length 30 cm packed with 20 ml of Diaion CRA-100, at a space velocity of 10 hr$^{-1}$. The column temperatures in both columns were maintained to 5° C. After the purification, the iron content was 0.6 ppb, and the aluminum content was 0.7 ppb.

Comparative Example 4

10 liters of 31 wt % raw aqueous hydrogen peroxide solution containing 20 ppb of aluminum, 3 ppb of iron and 10 ppm of total phosphate anions as impurities was passed through a Teflon-made column of inside diameter 15 mm and length 30 cm packed with 20 ml of a cation exchange resin Amberlite IRA-120B (H type, made by Organo Corporation), at a flow rate of a space velocity of 10 hr$^{-1}$. The concentration of total phosphate anions in the aqueous hydrogen peroxide solution after the passing was 10 ppm. The resultant aqueous hydrogen peroxide solution was then passed through a Teflon-made column of inside diameter 15 mm and length 30 cm packed with 20 ml of Diaion CRA-100, at a space velocity of 10 hr$^{-1}$. The column temperatures in both columns were maintained to 5° C. After the purification, the iron content was 0.5 ppb, and the content of aluminum was 3 ppb.

Comparative Example 5

10 liters of 31 wt % raw aqueous hydrogen peroxide solution containing 20 ppb of aluminum, 3 ppb of iron and 10 ppm of total phosphate anions as impurities was passed through a Teflon-made column of inside diameter 15 mm and length 30 cm packed with 20 ml of Diaion CRA-100, at a space velocity of 10 hr$^{-1}$. The concentration of total phosphate anions in the aqueous hydrogen peroxide solution after the passing was 10 ppm. The resultant aqueous hydrogen peroxide solution was then passed through a Teflon-made column of inside diameter 15 mm and length 30 cm packed with 20 ml of an anion exchange resin Amberlite IRA-400, at a flow rate of a space velocity of 10 hr$^{-1}$. The column temperatures in both columns were maintained to 5° C. After the purification, the iron content was 1 ppb, and the aluminum content was 1.1 ppb.

Comparative Example 6

10 liters of 31 wt % raw aqueous hydrogen peroxide solution containing 20 ppb of aluminum, 3 ppb of iron and 10 ppm of total phosphate anions as impurities was passed through a Teflon-made column of inside diameter 15 mm and length 30 cm packed with 20 ml of an anion exchange resin Amberlite IRA-400, which was treated with 250 ml of a 0.3N aqueous chelating agent solution over a period of one hour, and washed with 500 ml of deionized water over a period of two hours, at a space velocity of 10 hr$^{-1}$. The temperature in column was maintained at 5° C. After the purification, the iron content was 1.5 ppb, and the aluminum content was 8 ppb.

EFFECT OF THE INVENTION

According to this invention, it is possible to remove impurities from an aqueous hydrogen peroxide solution in high efficiency, and particularly it is possible to remove therefrom impurities such as iron and aluminum, which are removed only in low efficiency singly by ion exchange resins, in high efficiency up to an extremely low concentration of 0.2 ppb or less, and sometimes to be 0.1 ppb or less.

Highly pure hydrogen peroxide obtained by this invention can suitably be used for washing silicon wafers, etc.

What we claim is:

1. A process for the purification of hydrogen peroxide which comprises (A) contacting a crude hydrogen peroxide solution with an anion exchange resin or a mixture of an anion exchange resin and a cation exchange resin to make a content of total phosphate anions of under 0.1 ppm, and then (B) contacting the resultant hydrogen peroxide solution having a content of total phosphate anions of under 0.1 ppm with a chelate resin which is a member selected from the group consisting of an iminomethylenephosphonic acid type chelate resin and an iminodi(methylenephosphonic) acid type chelate resin to remove iron and aluminum impurities to a concentration of 0.2 ppb or less.

2. The process for purification of hydrogen peroxide according to claim 1 wherein the chelate resin is an iminomethylenephosphonic acid type chelate resin.

3. The process for purification of hydrogen peroxide according to claim 1 wherein the chelate resin is an iminodi(methylenephosphonic) acid type chelate resin.

4. The process for purification of hydrogen peroxide according to claim 1 wherein the process is conducted at a temperature of –15° to 15° C.

5. The process for purification of hydrogen peroxide according to claim 1 wherein the crude hydrogen peroxide solution is contacted with a strong-basic type of anion exchange resin in step (A).

6. The process of purification of hydrogen peroxide according to claim 1 wherein the crude hydrogen peroxide solution is contacted with a mixture of a strong-basic type of anion exchange resin and a strong-acid type of cation exchange resin in proportion of 10:90–90:10 in step (A).

* * * * *